Dec. 1, 1964  S. W. JENTZEN  3,159,437
DISPLAY SHELVING ASSEMBLY
Filed Dec. 11, 1962  6 Sheets-Sheet 1
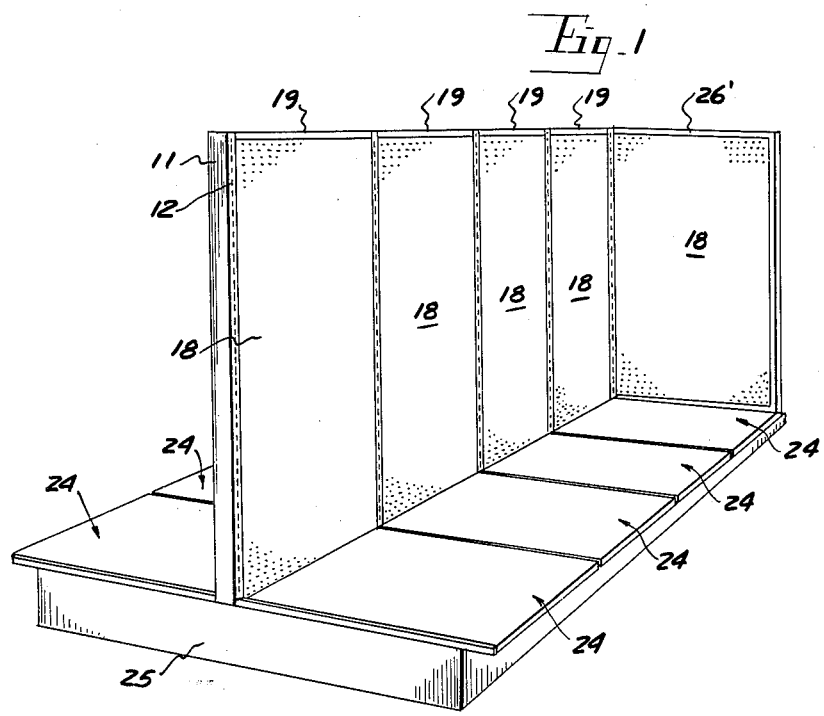
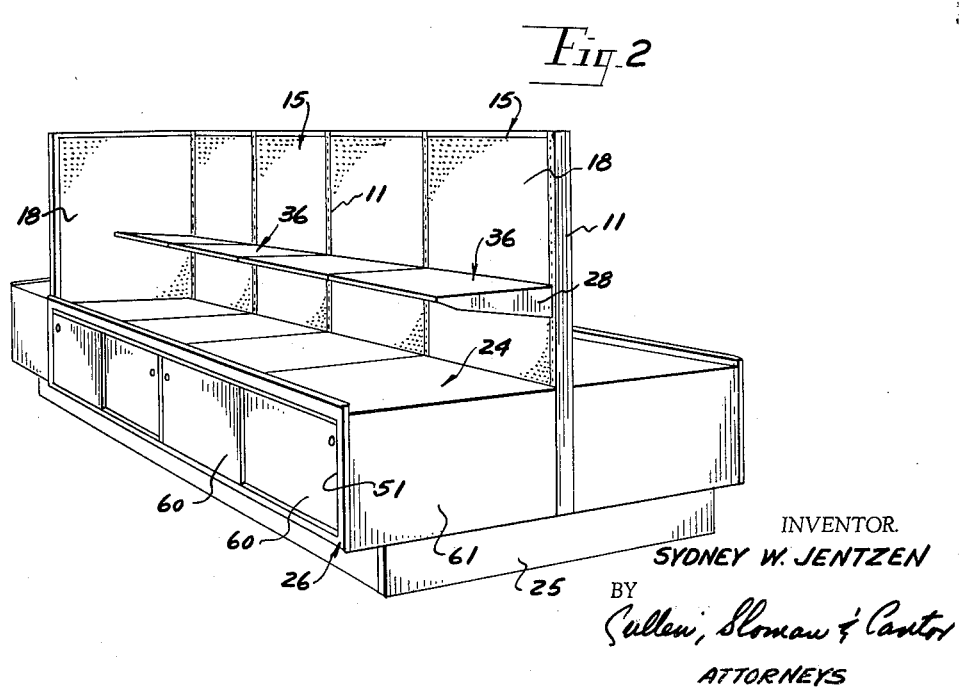
INVENTOR.
SYDNEY W. JENTZEN
BY
Cullen, Sloman & Cantor
ATTORNEYS Dec. 1, 1964  S. W. JENTZEN  3,159,437
DISPLAY SHELVING ASSEMBLY
Filed Dec. 11, 1962  6 Sheets-Sheet 2
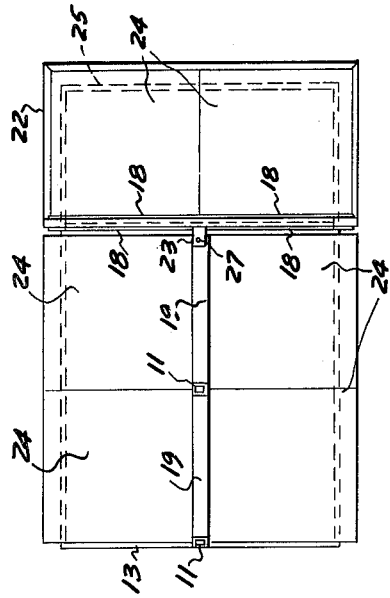
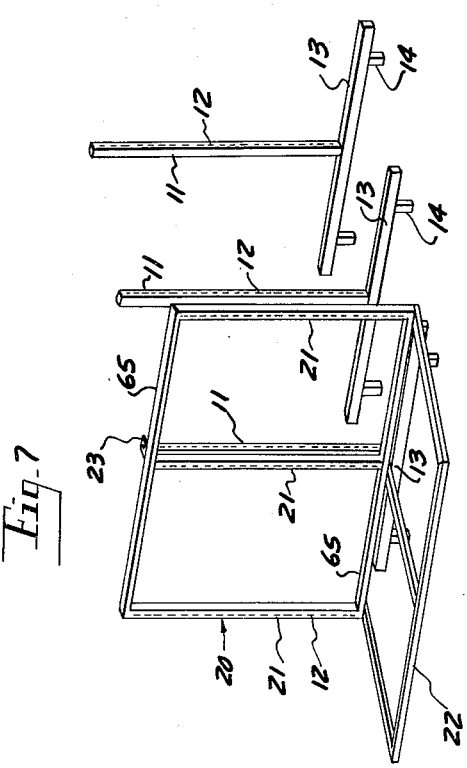
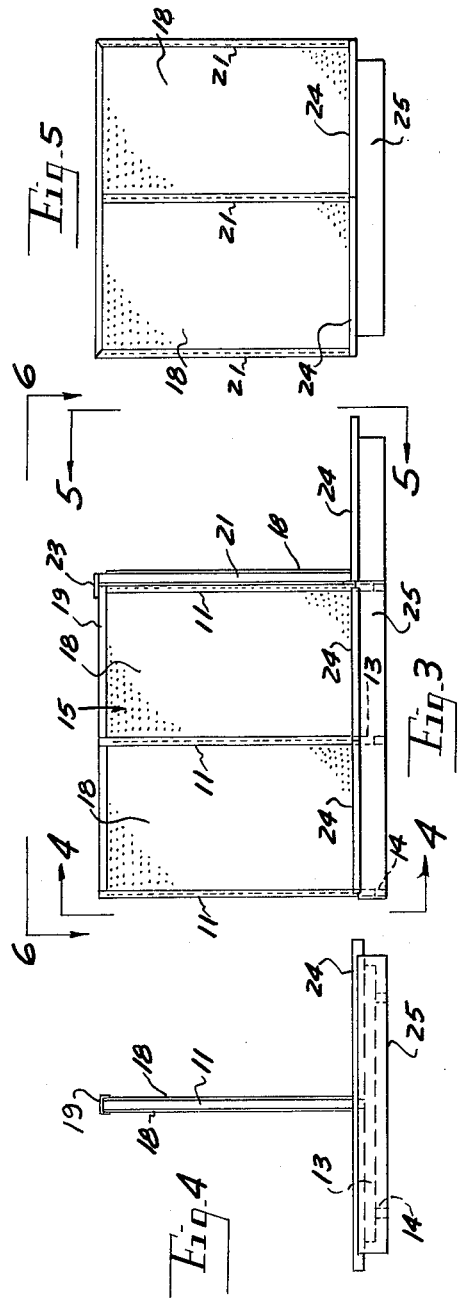
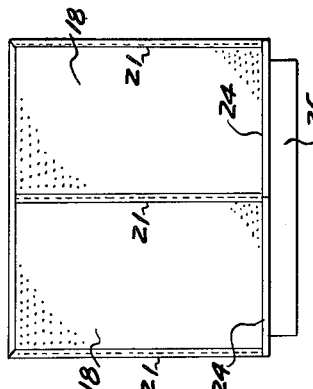
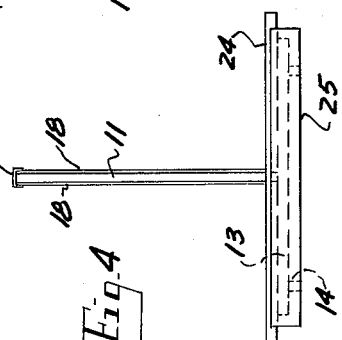
INVENTOR.
SIDNEY W. JENTZEN
BY Cullen, Sloman & Cantor
ATTORNEYS Dec. 1, 1964  S. W. JENTZEN  3,159,437
DISPLAY SHELVING ASSEMBLY
Filed Dec. 11, 1962  6 Sheets-Sheet 3
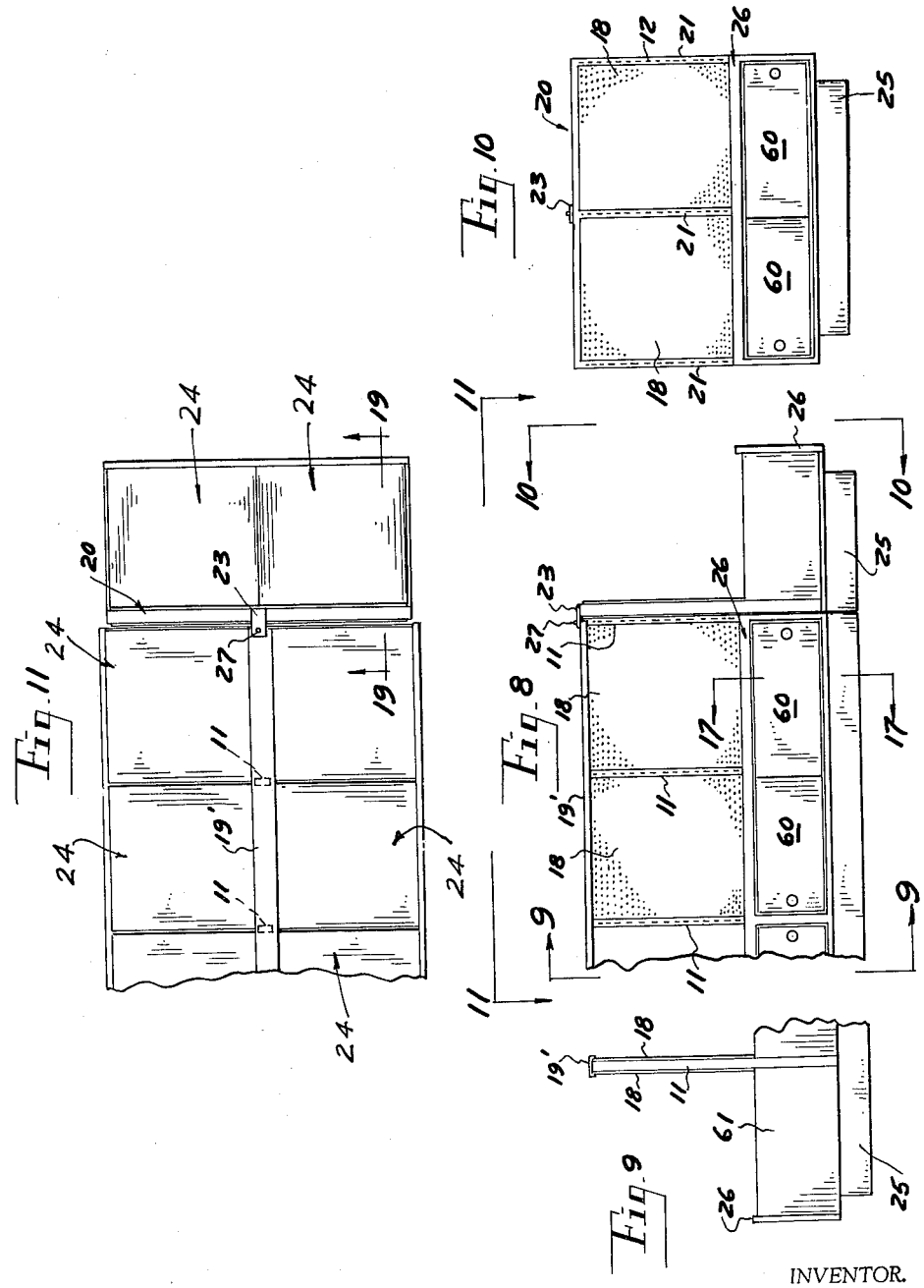
INVENTOR.
SYDNEY W. JENTZEN
BY
Cullen, Sloman & Cantor
ATTORNEYS

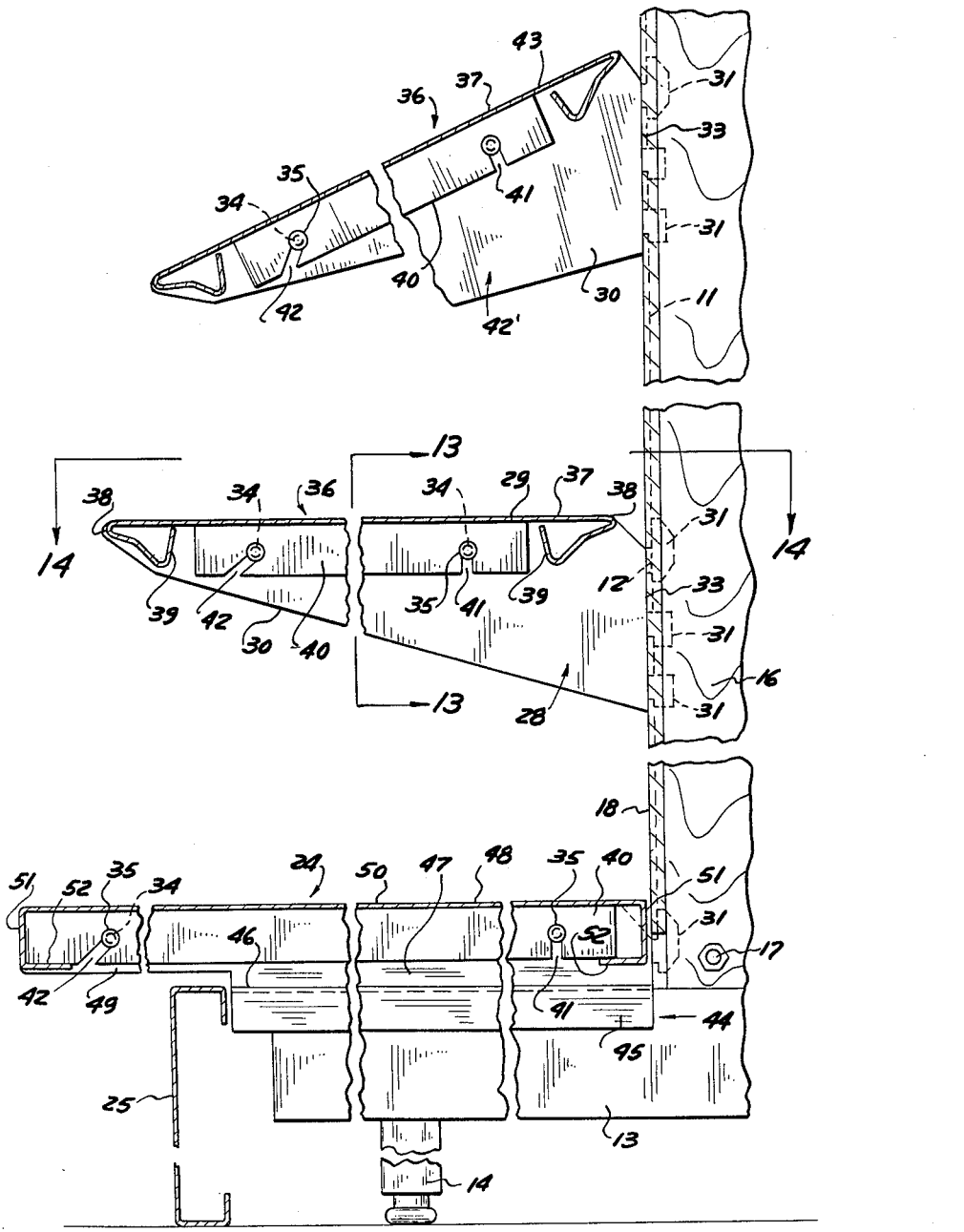

Dec. 1, 1964 S. W. JENTZEN 3,159,437
DISPLAY SHELVING ASSEMBLY
Filed Dec. 11, 1962 6 Sheets-Sheet 5
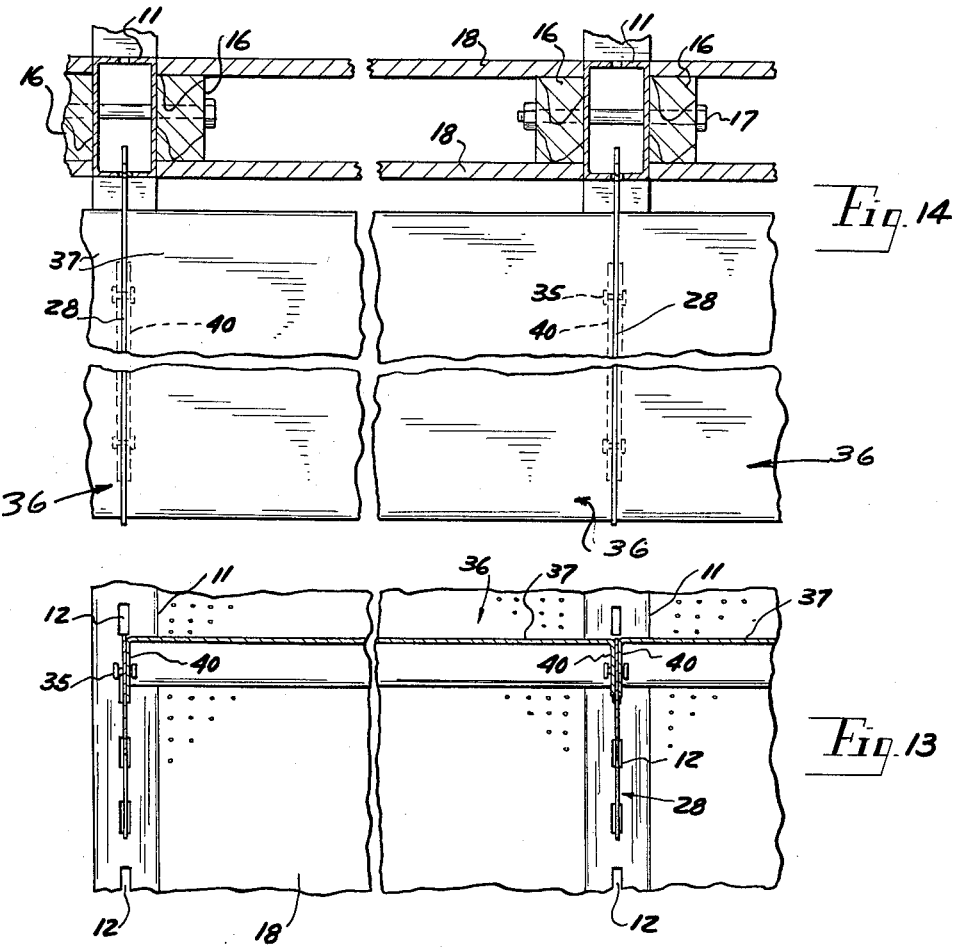
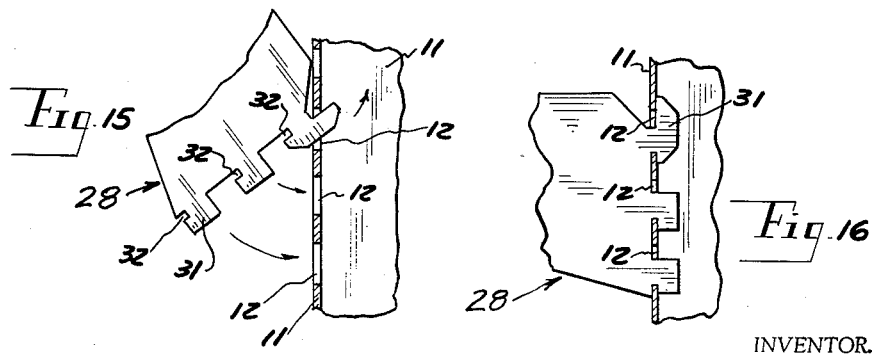
INVENTOR.
SYDNEY W. JENTZEN
BY
Cullen, Sloman & Cantor
ATTORNEYS

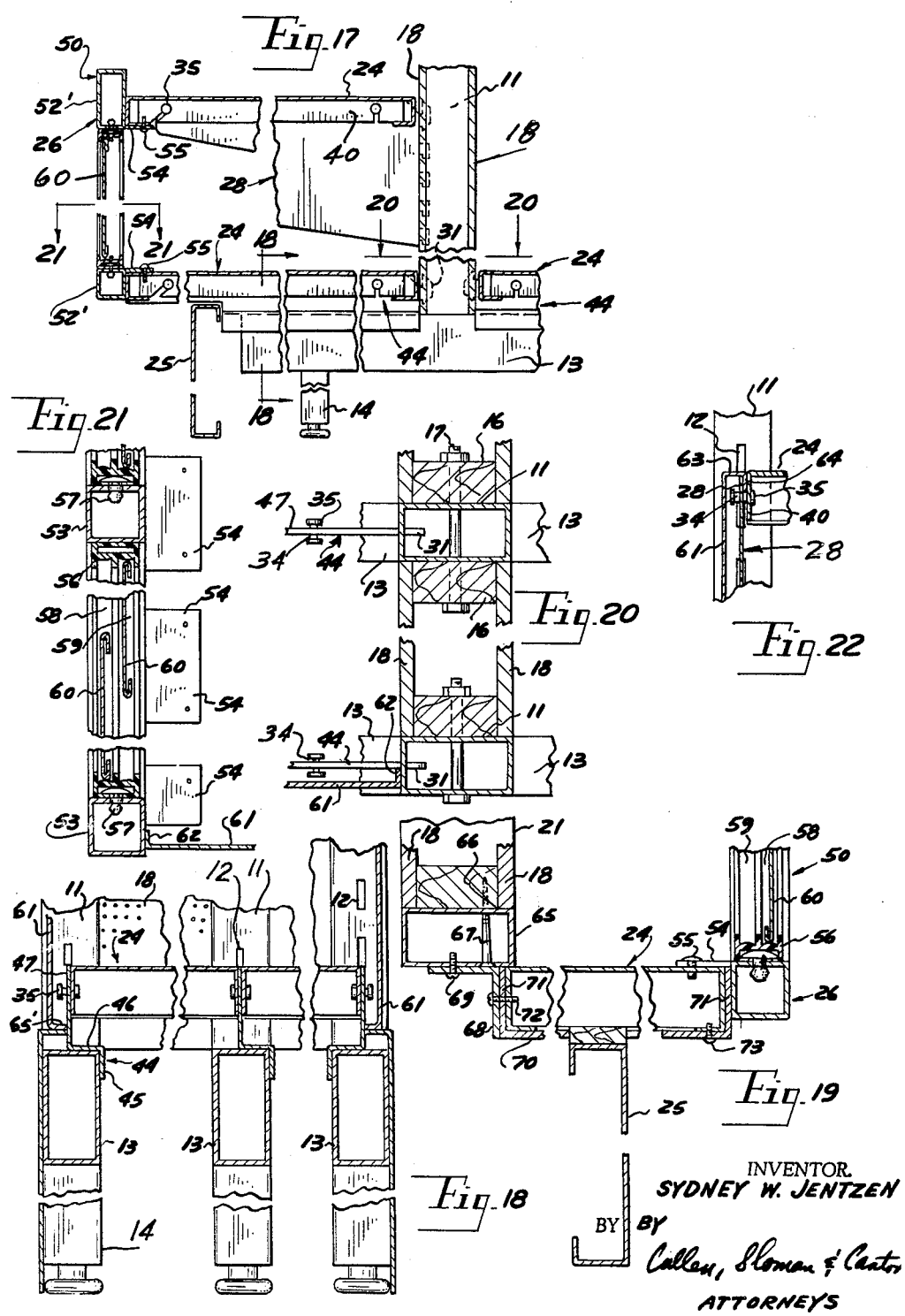

United States Patent Office 3,159,437
Patented Dec. 1, 1964

3,159,437
DISPLAY SHELVING ASSEMBLY
Sydney W. Jentzen, Bloomfield Hills, Mich., assignor to Jentzen-Miller Company, Troy, Mich., a corporation of Michigan
Filed Dec. 11, 1962, Ser. No. 243,784
2 Claims. (Cl. 312—108)

This invention relates to a display shelving assembly, and more particularly to a modular system of uniform frames, brackets, shelving and storage compartments by which there is great versatility permitting a large number of shelving arrangements and storage compartments.

It is an object of the invention to provide a novel form of display shelving assembly which includes a series of inverted T-shaped tubular frame elements which form the basic construction and wherein a series of the said frames may be employed to meet any particular shelving problem.

It is another object to provide a novel form of bracket construction employed in conjunction with the uprights of the frames by which said brackets may be interlocked and supported so as to project laterally from said frames.

It is another object to provide a novel bracket structure which provides a means by which the shelves may be arranged in longitudinally aligned edge to edge relation and supportably mounted upon said brackets including a novel interlock.

It is another object to provide a simplified and improved shelving assembly which may be adapted to provide with the said shelves a series of storage compartments with sliding doors.

These and other objects will be seen in the following specification and claims in conjunction with the appended drawings in which:

FIG. 1 is a front perspective view of one form of the display shelving assembly.

FIG. 2 is a perspective view of another form thereof, using the basic construction.

FIG. 3 is a side elevational view of a modification of FIG. 1.

FIG. 4 is a left end elevational view thereof.

FIG. 5 is a right end elevational view thereof.

FIG. 6 is a plan view thereof.

FIG. 7 is a fragmentary perspective view showing the spacing and arrangement of the basic frame elements for the structure shown in FIG. 3.

FIG. 8 shows a modification of the shelving assembly of FIG. 3 providing storage compartments.

FIG. 9 is a fragmentary view taken on line 9—9 of FIG. 8.

FIG. 10 is an end elevational view taken on line 10—10 of FIG. 8.

FIG. 11 is a fragmentary plan view taken on line 11—11 of FIG. 8.

FIG. 12 is a fragmentary vertical section such as might be taken through the forward portion of FIG. 1, with additional shelving and brackets therefor.

FIG. 13 is a fragmentary section taken on line 13—13 of FIG. 12.

FIG. 14 is a fragmentary section taken on line 14—14 of FIG. 12.

FIG. 15 is a fragmentary elevational section showing the method of interlockingly assemblying the brackets with respect to the upright portions of the frames.

FIG. 16 is a similar view with the interlock between the bracket and the frame completed corresponding to FIG. 12.

FIG. 17 is a fragmentary section taken on line 17—17 of FIG. 8 on an increased scale.

FIG. 18 is a fragmentary section on an increased scale taken on line 18—18 of FIG. 17.

FIG. 19 is a fragmentary section on an increased scale taken on line 19—19 of FIG. 11.

FIG. 20 is a fragmentary plan section on an increased scale taken on line 20—20 of FIG. 17.

FIG. 21 is a fragmentary plan section on an increased scale taken on line 21—21 of FIG. 17.

FIG. 22 is a fragmentary elevational section illustrating the mounting of the end panels for a storage compartment on the shelf supporting bracket.

It will be understood that the above drawings illustrate merely a preferred embodiment of the invention, and that other embodiments are contemplated within the scope of the claims hereafter set forth.

Referring to the drawings, FIGS. 1 and 2 are illustrative of the type of shelving assembly which may be put together using the elements hereafter described in connection with the other figures of the drawings and which incorporate the basic hollow tubular inverted T-shaped frame which includes the upright support 11 having upon its opposite sides a series of vertically aligned slots 12 and at its lower end the transverse laterally extending support 13 with depending longitudinally spaced legs 14. A series of these frames are first used in parallel spaced relation, FIG. 7, on to which a shelving assembly is built. Two or more frames are employed as desired, three being shown in FIG. 7.

Partition Construction

Upright spacer partitions generally indicated at 15, FIG. 3, are interposed in upright position between each adjacent pair of uprights 11 of the T frames. For this purpose, and as best shown in FIGS. 14 and 20, elongated upright backing blocks 16, preferably of wood, are positioned along the interior opposing edges of uprights 11 and secured thereto by bolts 17. Bolt 17 is arranged so as to secure a pair of upright backing blocks upon opposite sides of the upright 11 using a pair of longitudinally spaced bolts 17. The upright outer edges of backing blocks 16 are spaced inwardly of the front faces of uprights 11 so that upright pegboards 18 may be interposed between a pair of said uprights, bear against backing blocks 16 and be suitably secured thereto, either by an adhesive or by a fastener. The outer surfaces of pegboards 18 are substantially flush with the outer faces of uprights 11. Inverted channels 19, FIGS. 1, 3, 4 and 6 extend over the upper edges of opposed pairs of upright parallel pegboards 18 and may be suitably secured in position.

End Shelving Assembly

Referring to FIG. 2 upon opposite sides of the upright partitions 15, there are a series of shelves hereafter described, as well as a series of storage compartments. At the far end of FIG. 2, there is an end shelf construction which is further described in conjunction with FIGS. 3 through 11. For this purpose, there is provided the upright basic tubular frame 20 having a series of parallel spaced uprights 21 with top and bottom tubular crosspieces 65, FIG. 7.

The uprights 21 have formed in their front and rear surfaces the series of vertically aligned apertures 12, the same as shown in FIG. 1 and illustrated on an enlarged scale in FIG. 13, providing a means for mounting shelf supporting brackets. The horizontally disposed U-shape tubular frame 22 is suitably secured as by welding at its free ends to the bottom of end frame 20. Frame 20 at central portions at its top and bottom has laterally extending brackets 23 by which the said upright frame 20 is fixedly secured to the adjacent T-shaped frame 11-13 as best shown in FIGS. 3 and 6.

A series of shelves 24 span adjacent pairs of laterally extending frame portions 13 and are suitably retained thereon by brackets 44, FIG. 12, hereinafter described. Additional shelves 24 are also mounted upon and span the horizontal frame 22 of FIG. 7 as shown in FIGS. 3, 5 and 6 employing suitable brackets.

Upright channel 25 is in the nature of a kickboard or shoe and is arranged peripherally around the completed shelving such as shown in FIGS. 1 and 2 as well as in FIGS. 3, 5, 6 and 12 and provides the ornamental trim completing the structure. Fasteners 27 in FIG. 8 secure frame brackets 23, frame 20 to the adjacent frame 11–13.

Bracket Construction

For the shelves 36 in FIG. 2 there are provided a series of parallel laterally spaced brackets generally indicated at 28, which brackets are mounted upon the respective uprights 11 of the said frames in a fixed position. It is contemplated that shelving 36 may also be arranged upon the opposite side of partitions 15 of FIG. 2 since the vertically aligned bracket apertures 12 are formed in the opposing outer faces of uprights 11.

Bracket 28, FIG. 12, consists of a rigid upright plate having a horizontal top support surface 29, an outwardly and upwardly inclined bottom edge 30 and at its rear end a series of projecting interlocking means 31 in the nature of keys which are adapted to project through apertures 12 in uprights 11 as shown in FIG. 15 to provide the interlock shown in FIG. 16 by which said brackets are rigidly mounted to extend outwardly of the upright 11, FIG. 12.

Thus a series of parallel spaced upright brackets 28 are employed for shelves 36 shown in FIG. 2. The interlocking means 31 are projections which extend rearwardly of the plate and which include undercuts 32 providing a means by which once the interlocking members are assembled as shown in FIG. 16 the bracket 28 is fixedly retained in the position shown in FIG. 12, and wherein the upright rear edge 33 of the bracket operates to cooperatively bear against the outer upright apertured surface of upright 11.

A pair of longitudinally spaced horizontally disposed rivets 34 extend through the respective bracket plates with enlarged heads 35 at their outer ends spaced outwardly of brackets 28.

Shelf Construction

A series of shelves generally indicated at 36 FIGS. 2 and 12 are supportedly mounted and retained upon the respective pairs of brackets 28. Each of the shelves 36 includes top plate 37 with the front and rear edges thereof rounded and extending inwardly from the edge and terminating in the upturned flanges 39 which extend toward and engage the undersurface of plate 37. Flanges 40 depend from opposite sides of plates 37, there being an upright slot 41 and an inclined slot 42 formed in the respective flanges 40 adapted to interlockingly project over the rivets 34 and are retained by their heads 35, FIGS. 12, 13 and 14.

One of the slots 41–42 is inclined by which an interlock is provided against accidental upward displacement of the shelf 36 once it has been assembled upon and between a pair of brackets 28. In this connection, and as shown in FIGS. 13 and 14 one bracket 28 is effective for mounting the flanges 40 of a pair of adjacent shelves 36 in such a construction that the shelves are arranged in side by side longitudinal alignment as best shown in FIG. 2.

For certain types of display shelving to be inclined as shown generally at 36, FIG. 12, a slightly different form of bracket 42' is employed. The bracket is of a construction similar to bracket 28, includes the upright end face 33 which bears against upright 11 and is suitably interlocked therewith as at 31 in the same manner as above described. The top surface of bracket 42' is inclined downwardly at 43, but in all other respects is exactly the same as bracket 28 of FIG. 12. Shelf 36 is the same as the shelf mounted upon brackets 28, but of course, assumes the inclined position shown in FIG. 12.

For the bottom shelves 24, such as shown in FIG. 1, and FIGS. 3, 5 and 6 and also in FIG. 12, a slightly different form of bracket 44 is employed. This bracket has an elongated upright flange 45, FIG. 18 which bears against lateral support 13 of the frame, the right angular portion 46 which supportedly bears upon lateral support 13, member 46 terminating in upright bracket plate 47 which at its rear end has a locking projection 31 similar to the upper locking projection of bracket 28 and interlocks in one of the apertures 12 in upright 11, FIG. 12.

The opposite end of plate 47 extends forwardly at 49 beyond kickstrip 25 and as best shown in FIG. 1 to provide the support for the series of longitudinally aligned bottom series of shelves 24.

Each of these shelves includes top plate 50, depending front and rear upright flanges 51 which at their lower ends are inturned at right angles at 52. Plates 48 at their opposite sides terminate in depending flanges 40 which also have upright slot 41 and the inclined slot 42 which cooperatively register with similar headed rivets 34–35 which project through plates 47 and are secured thereto. In addition to anchoring bracket 44 at 31 in FIG. 12 to upright 11, said bracket 44 by virtue of flanges 45 and 46 is supportedly positioned upon the lateral member 13 which forms a part of the inverted T-frame of the basic structure. Accordingly, bottom bracket 44, except for the end bracket, is interposed between a pair of adjacent shelves 24 so that the respective depending flanges 40 thereof bear against opposite sides of the respective bracket plate 47 and are retained thereon by headed rivets 34–35.

Cabinet Construction

The shelf assembly of FIG. 1 can be modified to provide a cabinet construction as shown in FIG. 2. The bottom shelves 24 are employed in the same manner and there is employed a second series of top shelves 24 which are mounted upon uprights 11 of the basic T frames by a series of brackets corresponding to bracket 28 of FIG. 12, to thus maintain the upper shelves 24 in longitudinal alignment and in parallel spaced relation to the bottom series of longitudinally aligned shelves 24, FIGS. 1 and 12.

In order to provide closures for the cabinets provided in FIG. 2 between the vertically spaced shelves 24, there is provided an upright elongated tubular frame 26 which includes the top and bottom tubular members 52' FIG. 17, and a series of upright tubular spacers 53, FIG. 21, to thus provide a plurality of horizontally elongated rectangular apertures within which sliding doors 60 are movably positioned.

For the purpose of mounting frame 26 upon the forward upright edge portions 51 of the upper and lower series of shelves 24, there are provided a series of mounting plates 54, FIG. 21 which extend inwardly from edge portions of the top and bottom tubular frame elements 52' as best shown in FIG. 17 which engage the respective shelves 24 and are fixedly secured thereto by fasteners 55.

Within each of the rectangular apertures provided in frame 26 for the sliding doors there is provided a rectangularly formed rubber or plastic guideway assembly 56 which includes a series of integral projections 57 which extend through apertures in the adjacent framework 26 to take the assembled position shown in FIGS. 17 and 21 and thus define a pair of guide grooves 58 and 59 within which are slidably position doors 60.

The outer compartments are provided with end closure walls 61, FIGS. 20 and 21 which include the upright right angular flanges 62 at their front and rear edges, for registry between frame 26 and the adjacent upright 11. The upper edge of side plate 61 as shown in FIG. 22 is turned inwardly at 63 and downwardly at 64 providing a mounting flange which is slotted for cooperative supported registry over the headed rivets 34. The bottom edge of side plates 61 is inturned at 65' FIG. 18 for registry with bracket 44.

End Cabinet Construction

The construction shown in FIGS. 3 through 6 provides for end shelving 24. In the event that it is desired there be an end cabinet provided therefor, such a construction is possible with a slight modification of what is shown in FIGS. 3 through 6, as best illustrated in FIGS. 8 through 11. FIG. 7 shows one form of horizontally disposed end frame 22, whereas FIG. 19 shows a slightly different form. FIG. 19 is a fragmentary section taken on line 19—19 of FIG. 11. The end frame 20 includes top and bottom tubular members 65, FIGS. 7 and 19 and mounted upon the bottom frame element 65 and upon the undersurface of top frame element 65 are backing blocks 66, of the same construction as backing blocks 16 of FIG. 14, which backing blocks are secured in position by fasteners 67. The backing blocks are spaced inwardly of the outer edges of frame elements 65 to provide a clearance to receive the parallel spaced upright pegboards 18, of a construction exactly the same as above described with respect to FIG. 14.

As shown in FIG. 19, angle member 68 is secured at 69 to the undersurface of bottom frame element 65 by fasteners 69 and mounts the horizontally disposed support frame 70 whose end flange 71 bears against angle 68 and is secured thereto by fasteners 72. Shelves 24 are positioned within the hollow supporting frames 70 to provide the bottom shelving 24. To complete the cabinet construction for the end cabinets shown in FIGS. 8 and 10, a pair of brackets 28 are employed the same as shown in FIG. 17 to support the upper pair of shelves 24. A hollow tubular end frame 26 is provided of the same construction as above described with respect to FIG. 17 and 21 and which includes the supporting flanges 54 the same as above described in connection with FIG. 21 and FIG. 17 with suitable fasteners 55. Within the hollow frame 26 the same as above described with respect to FIGS. 2, 17 and 21, there is provided a guide means assembly 56 with channels 58 and 59 to slidably support doors 60 completing the construction of the end shelving. The forward portions of shelf 24 as shown in FIG. 19 are furthermore anchored to the support frame 70 by additional fasteners 73.

Having described my invention, reference should now be had to the following claims.

I claim:

1. A display cabinet assembly comprising a pair of spaced apart vertical support members, each having a vertical front face; a pair of vertically spaced apart brackets mounted upon each of said front faces and extending forwardly therefrom, to form two pairs of horizontally aligned upper and lower brackets, with each bracket having a horizontal upper support edge;

an upper shelf having its ends loosely rested upon the support edges of the upper brackets and a lower shelf having its ends loosely rested upon the support edges of the lower brackets;

a vertically arranged, rigid, rectangular shaped, four-sided frame having its upper side abutted against and covering the full length of the forward edge of the upper shelf and being rigidly secured to said upper shelf by a releasable mechanical fastening means, and the frame lower side being abutted against and covering the full length of the forward edge of the lower shelf and being rigidly secured to said lower shelf by a releasible mechanical fastening means;

and means formed on said frame for mounting doors in the opening thereof and including doors mounted upon said mounting means for covering the opening in said frame, thereby forming a rigid cabinet construction.

2. A construction as defined in claim 1 and including horizontally extending pins formed on each of said brackets; downwardly depending, vertical end flanges formed on each of the ends of said shelves, each flange being arranged in face to face contact with its adjacent support bracket; upwardly extending slots formed in the lower edges of each of said flanges and each slot receiving one of said pins for thereby restraining said shelves against movement forwardly of said support members.

References Cited by the Examiner

UNITED STATES PATENTS

| 1,176,588 | 3/16 | Miller. | |
|---|---|---|---|
| 1,729,268 | 9/29 | Henderson | 312—140.1 |
| 1,990,756 | 2/35 | Saaf | 108—107 X |
| 2,643,170 | 6/53 | Vanderveld | 312—108 |
| 2,710,241 | 6/55 | Lieberman | 312—257 |
| 2,934,181 | 4/60 | Weber. | |
| 2,971,805 | 2/61 | Weiss | 312—108 |
| 2,991,889 | 7/61 | Levy | 211—177 |
| 3,085,693 | 4/63 | Shell | 248—243 X |
| 3,101,681 | 8/63 | Streater | 108—28 |

FOREIGN PATENTS

| 214,913 | 10/56 | Australia. |
|---|---|---|
| 707,694 | 4/54 | Great Britain. |
| 775,255 | 5/57 | Great Britain. |
| 904,596 | 8/62 | Great Britain. |
| 904,603 | 8/62 | Great Britain. |
| 1,142,107 | 3/56 | France. |

FRANK B. SHERRY, *Primary Examiner.*